UNITED STATES PATENT OFFICE.

VIGGO DREWSEN, OF NEW YORK, N. Y., AND LAURITZ J. DORENFELDT, OF RHEINDUERKHEIM, GERMANY.

PROCESS OF UTILIZING SULFITE LYES.

SPECIFICATION forming part of Letters Patent No. 620,755, dated March 7, 1899.

Application filed October 3, 1898. Serial No. 692,550. (No specimens.)

*To all whom it may concern:*

Be it known that we, VIGGO DREWSEN, residing in the city of New York, borough of Richmond, and State of New York, and LAURITZ J. DORENFELDT, residing at Rheinduerkheim, in the Empire of Germany, citizens of the Kingdom of Sweden and Norway, have invented certain useful Improvements in Processes of Utilizing the Waste Liquors from Sulfite-Pulp Mills, of which the following is a specification.

It is well known that the disposition of the waste liquors from sulfite-pulp mills is a matter of considerable trouble where the mills are not located close to large streams, and even located on such streams or rivers the waste liquors give considerable trouble, as they pollute the water and are known by an objectionable smell to considerable distances. Experiments have been made by which the waste liquors can be utilized to advantage by regaining the sulfurous acid and soda and utilizing the gaseous products as a source of heat for generation of steam and other purposes.

Our invention is based on the fact that the residuum obtained by the evaporation of the waste cooking liquors possesses considerable calorific value. Thus, for example, the residuum from the cooking liquor from one thousand kilograms of cellulose is equal to from seven hundred to eight hundred kilograms of coal of calorific power of seven thousand metrical centigrade units of heat. If this heat can be properly utilized, it will be possible to get rid of the waste cooking liquors in connection with the rational evaporation of the same, so that the products obtained will practically cover the expense of the process.

The residuum which is obtained by the evaporation of the waste liquors consists largely of soda, which can always be used over again. To obtain the residuum in proper condition, a quantity of calcium carbonate corresponding with the quantity of sulfur contained in the waste liquor is added to the residuum. We have found by experiments that not every calcium carbonate will be of equal value in our process, but that the best form of the same is a chemically-precipitated calcium carbonate. As such chemically-precipitated calcium carbonate would be in most cases too expensive and therefore impracticable, we have adopted the following method with considerable success: The waste cooking liquor, containing sodium bisulfite, is neutralized with recovered soda and the water in the liquor evaporated either in a steam-boiler or vacuum-pan or other suitable apparatus, and the residuum thus obtained is burned in a suitable furnace, with the proper addition of calcium carbonate (preferably in a chemically-precipitated form) in such quantity as will correspond with the fifty to one hundred and fifty kilograms of sulfur which is contained in the waste liquor for every one thousand kilograms of cellulose. The hot gases which are developed by the combustion are carried off and utilized for heating purposes, preferably for heating steam-boilers, while the inorganic residuum, which in its chemical composition does not differ greatly from the crude soda of the Le Blanc soda process, is leached with water. This solution of water, however, still contains traces of sodium sulfid, ($Na_2S$,) which would cause trouble in the digesting process carried on with the soda by precipitation of sulfur and the formation of polythionic acids. The soda solution is therefore treated with carbonic acid, and being thus freed from sodium sulfid it may be used again in the preparation of sodium-bisulfite liquor. The working loss of soda is made up for by sulfate of soda, normal or bisulfate, of which the former is added to the spent liquor before the concentration, whereas the latter—the bisulfate of soda—is best added in the furnace along with the lime. The residuum from the leaching, consisting chiefly of sulfid of lime, ($CaS$,) is now treated so as to recover the sulfur, precipitated carbonate of lime being produced at the same time. The treatment consists in stirring the residuum (sulfid of lime) with water to form a dense milky fluid, into which carbonic acid is led, carbonate of lime being thereby precipitated, and the sulfureted hydrogen gas ($H_2S$) produced is led away, for example, into a Claus kiln to be burned to $SO_2$ or to recover the sulfur. On an average and in proportion to the different methods of digesting one hundred kilos of sulfur are recovered for every one thousand kilos of cellulose, and the value of this sulfur is so considerable that even in small mills the sulfur regeneration can be carried out to profit. The carbonate of lime produced by the process is dried and added to the residuum of the evaporated liquors which is to be burned.

Further, the above method may be used in such sulfite-pulp mills which, instead of using bisulfite-of-soda liquors, prefer to use other bisulfite liquors—as, for example, bisulfite of lime or bisulfite of magnesium. These liquors are similarly neutralized with recovered soda; but the recovered soda is not employed to make sodium-bisulfite liquor. It is used only to neutralize the spent liquors, the chief object being to render the regeneration of the sulfur possible.

Having thus described our invention, we desire to claim as new and to secure by Letters Patent—

The process herein described of utilizing the waste liquors of sulfite-pulp mills, which consists in the following steps: first, neutralizing the waste liquor with sodium carbonate, evaporating the so-neutralized liquor under addition of calcium carbonate, burning the residuum obtained, separating the sodium carbonate contained in the residuum by leaching, treating the insoluble calcium sulfid with carbonic acid so as to transform the calcium sulfid into sulfureted hydrogen and precipitated calcium carbonate, and converting the sulfureted hydrogen into sulfurous acid or sulfur.

In testimony that we claim the foregoing as our invention we have signed our names in presence of two subscribing witnesses.

VIGGO DREWSEN.
LAURITZ J. DORENFELDT.

Witnesses as to Viggo Drewsen's signature:
PAUL GOEPEL,
GEO. L. WHEELOCK.

Witnesses as to L. J. Dorenfeldt's signature:
FRANZ STAAB,
HEINRICH VOIGT.